United States Patent
Szasz et al.

(10) Patent No.: US 11,087,536 B2
(45) Date of Patent: Aug. 10, 2021

(54) METHODS, DEVICES AND COMPUTER PROGRAM PRODUCTS FOR GENERATION OF MESH IN CONSTRUCTED 3D IMAGES

(71) Applicant: SONY CORPORATION, Tokyo (JP)

(72) Inventors: Pal Szasz, Lund (SE); Johannes Elg, Helsingborg (SE); Fredrik Mattisson, Lund (SE)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 16/641,451

(22) PCT Filed: Aug. 31, 2017

(86) PCT No.: PCT/US2017/049532
§ 371 (c)(1),
(2) Date: Feb. 24, 2020

(87) PCT Pub. No.: WO2019/045714
PCT Pub. Date: Mar. 7, 2019

(65) Prior Publication Data
US 2020/0202624 A1    Jun. 25, 2020

(51) Int. Cl.
*G06T 17/20* (2006.01)
*G06T 7/50* (2017.01)
*G06T 7/60* (2017.01)

(52) U.S. Cl.
CPC .............. *G06T 17/205* (2013.01); *G06T 7/50* (2017.01); *G06T 7/60* (2013.01); *G06T 2207/10028* (2013.01); *G06T 2210/56* (2013.01)

(58) Field of Classification Search
CPC ........... G06T 17/205; G06T 7/50; G06T 7/60; G06T 2207/10028; G06T 2210/56
See application file for complete search history.

(56) References Cited

U.S. PATENT DOCUMENTS

| | | | | |
|---|---|---|---|---|
| 6,466,892 B2 * | 10/2002 | Fujii | ....................... | G06T 17/20 345/418 |
| 2002/0190982 A1 * | 12/2002 | Kotcheff | ................. | G06T 17/20 345/420 |

(Continued)

OTHER PUBLICATIONS

PCT International Search Report and Written Opinion of the International Searching Authority dated Apr. 30, 2018 for corresponding PCT International Application No. PCT/US2017/049532.

*Primary Examiner* — Said Broome
(74) *Attorney, Agent, or Firm* — Myers Bigel, P.A.

(57) ABSTRACT

Methods, systems and computer program products for the generation of 3D images may include receiving a plurality of points that correspond to a surface of an object, generating a first mesh representation of a shape of the object, the first mesh representation comprising a plurality of polygons, respective ones of the plurality of polygons comprising at least three vertices and at least three edges, associating the plurality of points with a first set of the plurality of polygons, classifying a portion of the plurality of points as background points, and adjusting the first mesh representation of the object to create a second mesh representation of the object by removing from the first mesh representation at least one of the first set of the plurality of polygons that is associated with the portion of the plurality of points that are classified as the background points.

18 Claims, 9 Drawing Sheets

(56) References Cited

U.S. PATENT DOCUMENTS

| | | |
|---|---|---|
| 2012/0051631 A1 | 3/2012 | Nguyen et al. |
| 2012/0257796 A1* | 10/2012 | Henderson ................ G06T 7/12 |
| | | 382/109 |
| 2014/0132715 A1* | 5/2014 | Raghoebardayal ..... A63F 13/40 |
| | | 348/43 |
| 2014/0363048 A1 | 12/2014 | Vrcelj et al. |
| 2016/0150217 A1 | 5/2016 | Popov |
| 2017/0161947 A1* | 6/2017 | Lindahl ................... G06T 19/20 |
| 2017/0193699 A1* | 7/2017 | Mehr ...................... G06F 17/10 |

* cited by examiner

METHODS, DEVICES AND COMPUTER PROGRAM PRODUCTS FOR GENERATION OF MESH IN CONSTRUCTED 3D IMAGES

CROSS REFERENCE TO RELATED APPLICATION

This application is a 35 U.S.C. § 371 national stage application of PCT International Application No. PCT/US2017/049532, filed on Aug. 31, 2017, the content of which is incorporated herein by reference in its entirety. The above-referenced PCT International Application was published in the English language as International Publication No. WO 2019/045714 A1 on Mar. 7, 2019.

FIELD

Various embodiments described herein relate to methods and devices for image processing and, more particularly, to creating 3D images.

BACKGROUND

There are multiple environments in which three-dimensional (3D) models of real physical objects may be useful. For example, 3D printing may make allow the generation of a model of an object based on a generated 3D representation of the object. As another example, immersive computing environments may use 3D models to represent and/or display real objects in a 3D virtual space. Generating a 3D model of a physical object may involve using a camera to record images of the physical object, and mapping a shape and surface of the object in virtual space. One such method to map the object to virtual space is a technique known as Simultaneous Localization and Mapping (SLAM).

SLAM relates to the process of constructing or updating a map of an object while a user's location is non-static in the environment. In mono-camera systems, image-based positioning algorithms may use SLAM techniques to create 3D images for augmented reality, 3D printing, 3D model development, and other applications. An important part of using SLAM techniques is the baseline initialization of an inferred 3D image from two-dimensional (2D) coordinates. By inferring the 3D image from the 2D coordinates, SLAM techniques can generate a 3D model from a series of 2D images from a camera, which can allow the generation of a 3D model from the series of images. Generating the 3D model of the object from the images can be a time-consuming process utilizing large amounts of computer processing power and computer resources.

SUMMARY

Various embodiments described herein provide methods, systems, and computer program products for the generation of a 3D image from 2D images.

According to some embodiments described herein, a method of creating a three-dimensional mesh representation of an object includes receiving a plurality of points that correspond to a surface of the object, respective ones of the plurality of points having three-dimensional spatial coordinates, generating a first mesh representation of a shape of the object, the first mesh representation including a plurality of polygons, respective ones of the plurality of polygons including at least three vertices and at least three edges, associating the plurality of points with a first set of the plurality of polygons, classifying a portion of the plurality of points as background points, and adjusting the first mesh representation of the object to create a second mesh representation of the object by removing from the first mesh representation at least one of the first set of tie plurality of polygons that is associated with the portion of the plurality of points that are classified as the background points. In some embodiments, the method may include storing the second mesh representation in the memory of the electronic device. In some embodiments, the method may be performed in the memory of an electronic device.

According to some embodiments described herein, an imaging system includes a processor, and a memory coupled to the processor and storing computer readable program code that when executed by the processor causes the processor to perform operations including receiving, within a memory of an electronic device, a plurality of points that correspond to a surface of the object, respective ones of the plurality of points having three-dimensional spatial coordinates, generating, within the memory, a first mesh representation of a shape of the object, the first mesh representation including a plurality of polygons, respective ones of the plurality of polygons including at least three vertices and at least three edges, associating the plurality of points with a first set of the plurality of polygons, classifying a portion of the plurality of points as background points, and adjusting the first mesh representation of the object to create a second mesh representation of the object by removing from the first mesh representation at least one of the first set of the plurality of polygons that is associated with the portion of the plurality of points that are classified as the background points.

A computer program product for operating an imaging system includes a non-transitory computer readable storage medium having computer readable program code embodied in the medium that when executed by a processor causes the processor to perform the method embodiments described herein.

In some embodiments, classifying the portion of the plurality of points as the background points includes determining a first distance to a center of the object from an image capturing device, calculating a distance threshold based on the distance to the center of the object, determining a second distance to a first point of the plurality of points from the image capturing device, and classifying the first point of the plurality of points as one of the background points in response to determining that the second distance is greater than the distance threshold.

In some embodiments, calculating the distance threshold includes determining a distance radius based on a size of the object, and calculating the distance threshold as the first distance to the center of the object plus a product of the distance radius and a scale factor.

In some embodiments, the scale factor is between 1.1 and 1.5.

In some embodiments, removing from the first mesh representation the at least one of the first set of the plurality of polygons includes removing the at least one of the plurality of polygons responsive to determining that each point of the plurality of points that is associated with the at least one of the plurality of polygons is classified as one of the background points.

In some embodiments, removing from the first mesh representation the at least one of the first set of the plurality of polygons includes removing the at least one of the plurality of polygons responsive to determining that each point of the plurality of points that is associated with the at least one of the plurality of polygons is classified as one of the background points and to determining that each of the at least three edges of the at least one of the plurality of polygons is adjacent a polygon of the plurality of polygons that is only associated with ones of the plurality of points that are classified as the background points.

In some embodiments, removing from the first mesh representation the at least one of the plurality of polygons includes removing the at least one of the first set of the plurality of polygons responsive to determining that each point of the plurality of points that is associated with the at least one of the plurality of polygons is classified as one of the background points and to determining that each of the at least three vertices of the at least one of the plurality of polygons is adjacent a polygon of the plurality of polygons that is only associated with ones of the plurality of points that are classified as the background points.

In some embodiments, the plurality of polygons are triangles having three vertices and three edges.

In some embodiments, the operations of the method, imaging system, and/or computer program product further include receiving a second plurality of points that correspond to the surface of the object, associating the second plurality of points with a second set of the plurality of polygons of the second mesh representation, classifying a portion of the second plurality of points as the background points, adjusting the second mesh representation of the object to create a third mesh representation of the object by removing from the second mesh representation at least one of the second set of the plurality of polygons that is associated with the portion of second plurality of points that are classified as the background points, and storing the third mesh representation in the memory.

In some embodiments, the operations of the method, imaging system, and/or compute program product further include displaying the second mesh representation on a display.

Advantageously, these embodiments may quickly refine a preliminary 3D model to remove extraneous background material. For example, these operations may not require performing calculations for background portions of a mesh representation during subsequent processing. These operations may thus simplify and expedite the generation of a 3D model, and may reduce processing time and resources by more quickly refining the 3D model.

It is noted that aspects of the inventive concepts described with respect to one embodiment, may be incorporated in a different embodiment although not specifically described, relative thereto. That is, all embodiments and/or, features of any embodiment can be combined in any way and/or combination. Other operations according to any of the embodiments described herein may also be performed. These and other aspects of the inventive concepts are described in detail in the specification set forth below.

BRIEF DESCRIPTION OF THE DRAWINGS

The above and other objects and features will become apparent from the following description with reference to the following figures, wherein like reference numerals refer to like parts throughout the various figures unless otherwise specified.

DETAILED DESCRIPTION

Figure 1:
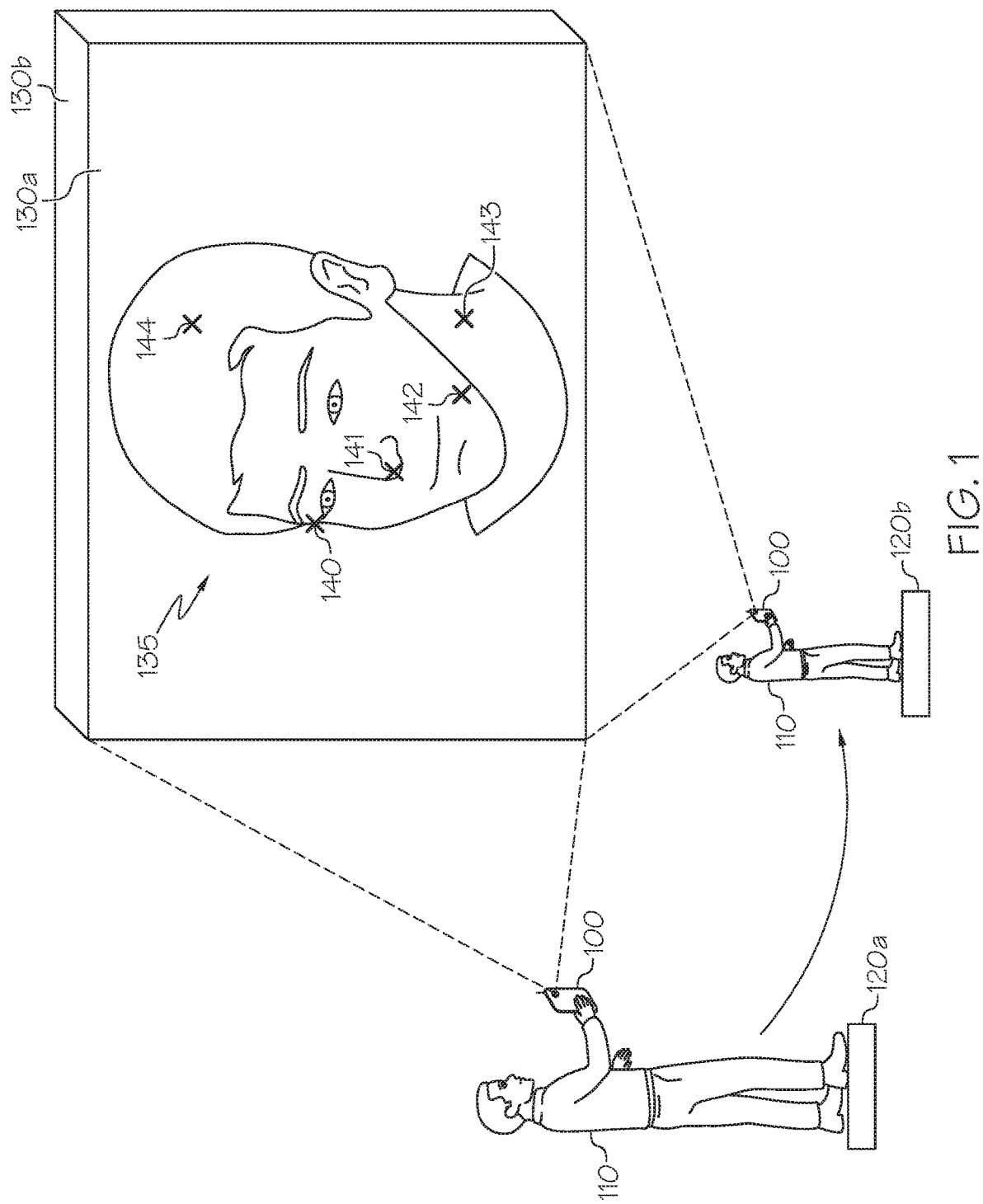
FIG. 1 illustrates a user taking pictures with a camera as part of a 3D construction of an object, according to various embodiments described herein.

Various embodiments will be described more fully hereinafter with reference to the accompanying drawings. Other embodiments may take many different tarns and should not be construed as limited to the embodiments set forth herein. Like numbers refer to like elements throughout.

Applications such as 3D imaging, mapping and navigation may use SLAM, which provides a process for constructing or updating a map of an unknown environment while simultaneously keeping track of an object's location within it. This computational problem is recognized to be a chicken-and-egg problem since the object may be moving and the environment may be changing. 2D images of real objects may be captured with the objective of creating a 3D image that is used in real-world applications such as augmented reality, 3D printing, or 3D visualization with different perspectives of the real objects. The generated 3D representation of the objects may be characterized by feature points that are specific locations on the physical object in the 2D images that are of importance for the 3D representation such as corners, edges, center points, and other specific areas on the physical object. There are several algorithms used for solving this computational problem associated with 3D imaging, using various approximations. Popular approximate solution methods include the particle filter and Extended Kalman Filter (EKF). The particle filter, also known as a Sequential Monte Carlo (SMC) linearizes probabilistic estimates of data points. The Extended Kalman Filter is used in non-linear state estimation in applications including navigation systems such as Global Positioning Systems (GPS), self-driving cars, unmanned, aerial, vehicles, autonomous underwater vehicles, planetary rovers, newly emerging domestic robots, medical devices inside the human body, and/or imaging systems. Imaging systems may generate 3D representations of an object using SLAM techniques by performing a transformation of the object in a 2D image to produce a 3D representation of the object.

However, the underlying 2D images often involve elements which are extraneous to the object for which the 3D image is intended. For example, a 2D image of a person may be taken from several different angles to develop a 3D model of the person. The 2D images, however, may contain background elements such as walls, furniture, other persons, etc. Because these additional elements are part of the 2D image, the 3D modeling process may additionally process these extraneous images. This can cause two problems. First, the additional processing for the extraneous objects may increase the overall processing time for the model. This can make the generation of the 3D model cumbersome and time consuming. Second, the extraneous objects can add noise to the it algorithms which can affect the accuracy of the 3D model. Since the 3D modeling infers 3D positioning from 2D images, processing extraneous elements across multiple iterative scans can introduce inaccuracies in the 3D model of the object.

Various embodiments described herein may arise from the recognition that early identification of background elements associated with the object its 2D scans can improve the quality of the generated 3D mesh representation of the object and reduce the time to generate the 3D mesh representation. By identifying, and removing, background elements early in the processing of the mesh representation, the overall processing is streamlined. Moreover, the removal of the background portions from the mesh representation early in the scanning processing may quickly remove large portions of the mesh representation, which may reduce the number of elements in the mesh representation that need to be analyzed on subsequent scans and may provide for rapid convergence of the mesh representation to a finalized 3D model of the scanned object.

Image sensors may be collocated with or integrated with a camera. The terms "image sensor." "image capturing device," and "camera" will be used herein interchangeably. The camera may be implemented with integrated hardware and/or software as part of an electronic device, or as a separate device. Types of cameras may include mobile phone cameras, security cameras, wide-angle cameras, narrow angle cameras, stereoscopic cameras and/or monoscopic cameras.

Figure 2A:
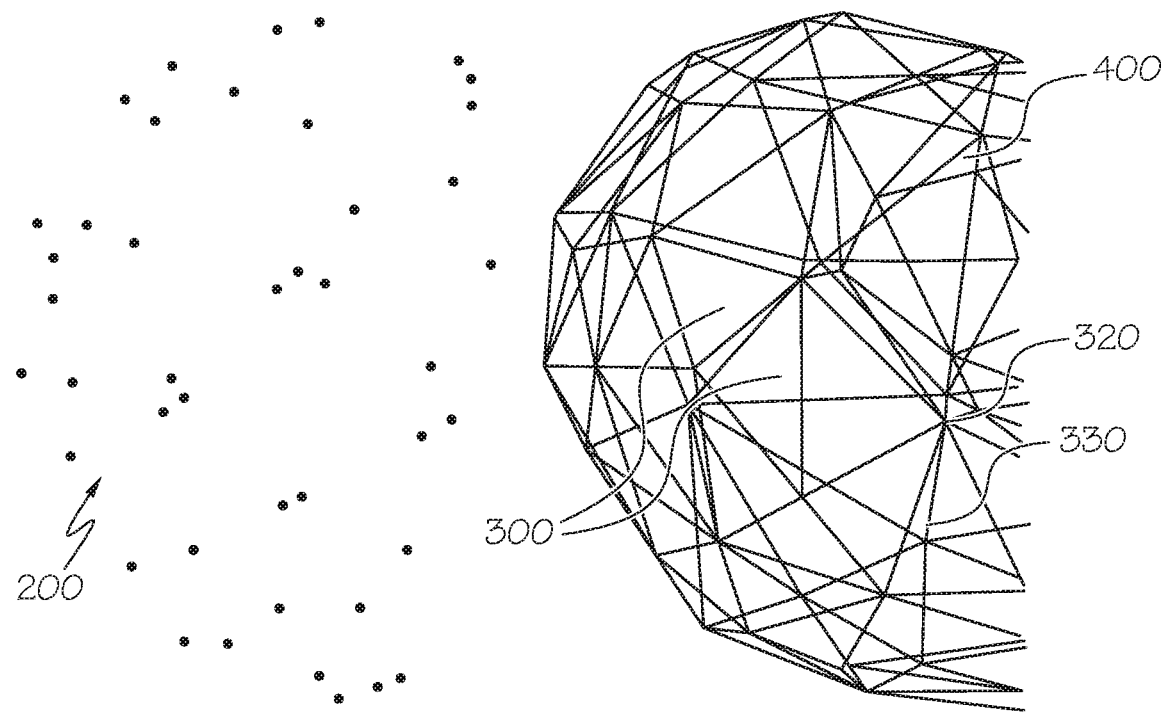
FIG. 2A illustrates the generation of a point cloud and mesh representation based on a 2D image, according to various embodiments described herein.
Figure 3A:
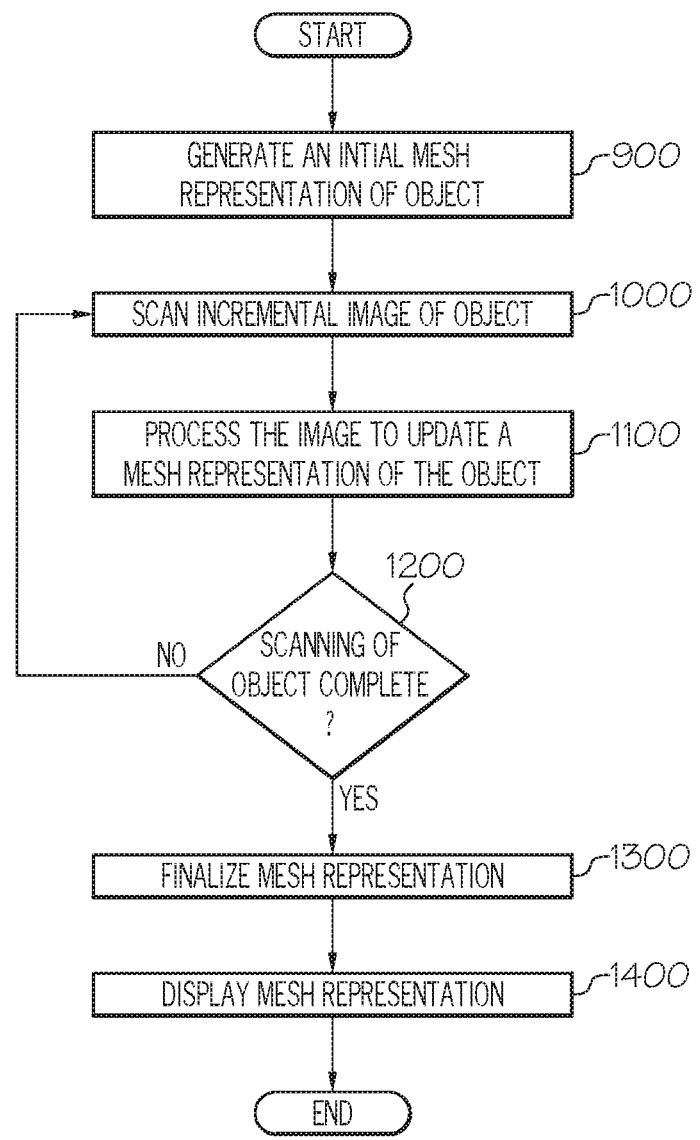
FIG. 3 illustrates a method for generating a 3D mesh from a series of 2D images, according to various embodiments described herein.
FIG. 3B illustrates a method for processing an image to update a mesh representation of an object, according to various embodiments described herein.

FIG. 1 illustrates a user taking pictures with a camera as part of a 3D construction of an object, according to various embodiments described herein. FIG. 2A illustrates the generation of a point cloud and mesh based on a two dimensional picture, according to various embodiments described herein. FIG. 3A illustrates a method for generating a 3D mesh from a series of 2D images, according to various embodiments described herein. Referring now to FIGS. 1, 2A, and 3A, methods, systems, and computer program products for generating a 3D image from a series of 2D images may include block 900 to generate an initial mesh representation of an object. The initial mesh representation may be a generic mesh representation that will be further refined responsive to subsequent scanning and analysis of the object. The operation may continue with block 1000 to scan an incremental image of the object. The incremental image may include one or more 2D images of the object. At, block 1100, the incremental image may be processed to update the mesh representation of the object based on the incremental image. If the scanning is not complete, as determined at block 1200, the operations may repeat blocks 1000 and 1100 to incrementally scan images of the object and further refine the mesh representation. In some embodiments, the methods described herein may be performed by a processor of an electronic device, which may include multiprocessor electronic devices, virtual electronic devices, and/or distributed computing systems, such as those utilized in a cloud infrastructure.

For example, as illustrated in FIG. 1, a user 110 may have a camera 100 with which they initiate a photographic session of the object 135, such as a person's face or other object, at location 120a. The user 110 may physically move around the object 135 to various locations such as from location 120a to location 120b, or the object 135 may be moved in relation to the camera 100. One or more, images of the object 135 may be captured at each location. For example, image 130a may be captured when the camera 100 is at location 120a and image 130b may be captured when camera 100 moves to location 120b. Each of the captured images may be 2D images. There may be a continuous flow of images from the camera 100 as the user 110 walks around the object 135 that is being scanned to capture images at various angles. Once the images, such as images 130a and 130b, are captured, the images may be processed by a processor in camera 100 or a processor external to the camera 100 to generate a 3D image. In some embodiments, a baseline initialization of the 3D image may occur once the first two images are captured. The quality of the baseline initialization is, evaluated to see if a satisfactory baseline initialization has occurred. Otherwise, further processing of additional images may take place.

The images may be processed by identifying points on the object 135 that were captured the first image 130a, the second image 130b, and/or subsequent images. The points may be various edges, corners, or other points on the object 135. The points are recognizable locations on the physical object 135 that may be tracked in various images of the physical object 135. Still referring to FIG. 1, points on the object 135 may include points 140 through 144. When the user 110 moves the camera 100 to a different location 120b, another image 130b is captured. This same process of capturing images and identifying points may occur on the order of tens, hundreds, or thousands of times in the context of creating a 3D image. The same points 140 through 144 may be identified in the second image 130b. The spatial coordinates, for example, the X, Y, and/or L coordinates, of the points 140 through 144 may be estimated using various statistical techniques.

FIG. 2A illustrates the generation of a point cloud 100 and mesh representation 400 based on a 2D image, according to various embodiments described herein. As illustrated in FIG. 2A, analysis of each image (e.g., images 130a and 130b) may result in the identification of points 140 through 144, which may collectively be referred to as point cloud 200, which is a plurality of points 200 identified from respective images of the object 135. From these identified plurality of points 200, methods, systems, and computer program products according to the present inventive concepts update a mesh representation 400 of the object 135 in block 1100. The mesh representation 400 may be composed of a plurality of polygons 300. In some embodiments, the polygons of the plurality of polygons 300 are triangles. The polygons 300 may include respective vertices 320 and edges 330. The polygons 300 of the mesh representation 400 may be interconnected such that respective ones of the polygons 300 share vertices 320 and/or edges 300 with other ones of the polygons 300. In some embodiments, the mesh representation 400 may be "watertight." As used herein, a watertight mesh representation 400 refers to a mesh representation 400 in which the interconnected polygons 300 form a contiguous surface across the entire mesh representation 400 such that there are no gaps or discontinuities in the mesh representation 400. The mesh representation 400 may depict some or all of a surface of the object 135 being scanned.

Respective vertices 320 of the mesh representation 400 may represent points of the object 135 being scanned and tracked. The points 200 may represent contours and/or other features of the surface of the object 135. Operations for generating a mesh representation 400 of the object 135 may attempt to map the plurality of points 200 extracted from a 2D image of the object 135 onto the polygons 300 of the mesh representation 400. It will be recognized that the mesh representation 400 is incrementally improved based on subsequent images, as the subsequent images provide additional points 200 which may be mapped to the plurality of polygons 300 of the mesh representation 400.

Refining the mesh representation 400 using a point cloud 200 may involve mathematically projecting the 3D location of the plurality of points 200 inferred from an image into and/or onto the mesh representation 400. For each point of the plurality of points 200, an analysis may be performed to determine whether the point lays on the mesh, representation 400, or whether the point is off (e.g., above/below/beside in a 3D space) the mesh representation 400. If the point is on the mesh representation 400, the point may be associated with a polygon of the polygons 300 of the mesh representation 400 that contains the point. If the point is of the mesh representation 400, it may indicate the mesh representation 400 needs to be adjusted. For example, the new point of the plurality of points 200 may indicate that the arrangement of the polygons 300 of the current mesh representation 400 is inaccurate and needs to be adjusted.

In some embodiments, to adjust the representation 400, a vertex 320 of one of the polygons 300 of the mesh representation 400 may be moved to a location in 3D space corresponding to the point of the point cloud 200 being analyzed, but the present inventive concepts are not limited thereto. In some embodiments, to adjust the mesh representation 400, the polygons 300 of the mesh representation 400 may be reconfigured and/or new polygons 300 added so as to include a location in 3D space corresponding to the point of the point cloud 200 being analyzed in the surface of the mesh representation 400. In some embodiments, the adjustment of the mesh representation 400 may be weighted so that the mesh representation 400 moves toward, but not entirely to, the location in 3D space corresponding to the point of the point cloud 200 being analyzed. In this way, the mesh representation 400 may gradually move towards the points of a point cloud 200 as multiple images are scanned and multiple point clouds 200 are analyzed.

Figure 2B:
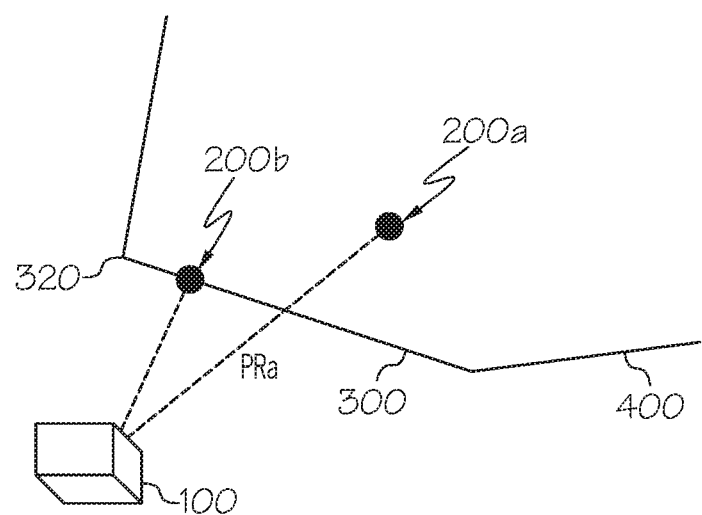
FIG. 2B illustrates a 2D representation of a portion of a mesh representation including polygons and points of a point cloud, according to various embodiments described herein.

FIG. 2B illustrates a 2D representation of a portion of a mesh representation 400 including polygons 300 and points 200a, 200b of a point cloud 200, according to embodiments as described herein. For example, as illustrated in FIG. 2B, projecting a first point 200a of the point cloud 200 onto the mesh representation may include forming a ray PRa from the origin (e.g., the camera 100) to the point 200a. Recall that both the points of the point cloud 200 and the mesh representation 400 will include 3D depth information (e.g., X, Y, and/or Z coordinates). Thus, an individual point 200a of the point cloud 200 can be spatially located with respect to the mesh representation 400. The formed ray PRa will indicate an intersection point in a polygon 300 of the mesh representation 400. FIG. 2B illustrates similar operations performed for a second point 200b of the point cloud 200. In some embodiments, the intersection of rays to the points (e.g., points 200a, 200b) of the point cloud 200 with polygons 300 of the mesh representation 400 indicate which portions and/or locations of the mesh representation 400 need to be adjusted to further refine the 3D image of the object 135.

A point (e-g points 200a, 200b) of the point cloud 200 that is protected into/onto a polygon 300 of the mesh representation 400 nay be mapped to and/or associated with that polygon 300. In addition, the point of the point cloud 200 may also be mapped to and/or associated with each vertex 320 and edge 330 of that mapped polygon 300. In some embodiments, the mapping of the point may be one-to-many, since a point that is projected into/onto a polygon 300 of the mesh representation 400 may be associated with the polygon 300, each of its edges 330, and each of its vertices 320.

In some embodiments, a location of a point of the point cloud 200 may be incongruous with the mesh representation 400. That is to say that a determined location of the point of the point cloud 200 may be greater than a predetermined distance from the inferred location of a surface of the mesh representation 400. Such a point may be discarded from processing. For example, the point may be an outlier, a digital artifact, or, as described herein, a background point which may not be included in the formulation of the surface of the mesh representation 400. By ignoring certain points in processing, undesired alteration of the mesh representation responsive to outlier and/or background points is reduced and/or eliminated.

As described herein, respective points of the point cloud 200 may be associated with and/or mapped to polygons 300 of the mesh representation 400. For example, respective points of the point cloud 200 may be associated with polygons 300 at existing locations of the mesh representation 400 or polygons 300 at adjusted locations of the mesh representation 400.

The process described herein may be repeated for multiple scans of the object 135, iteratively and continuously updating and refining the mesh representation 400 of the object 135.

Once the scanning is complete, the operations (see FIG. 3A) may continue with block 1300 to finalize the mesh representation 400 and block 1400 to display the finalized mesh representation 400.

Figure 3B:
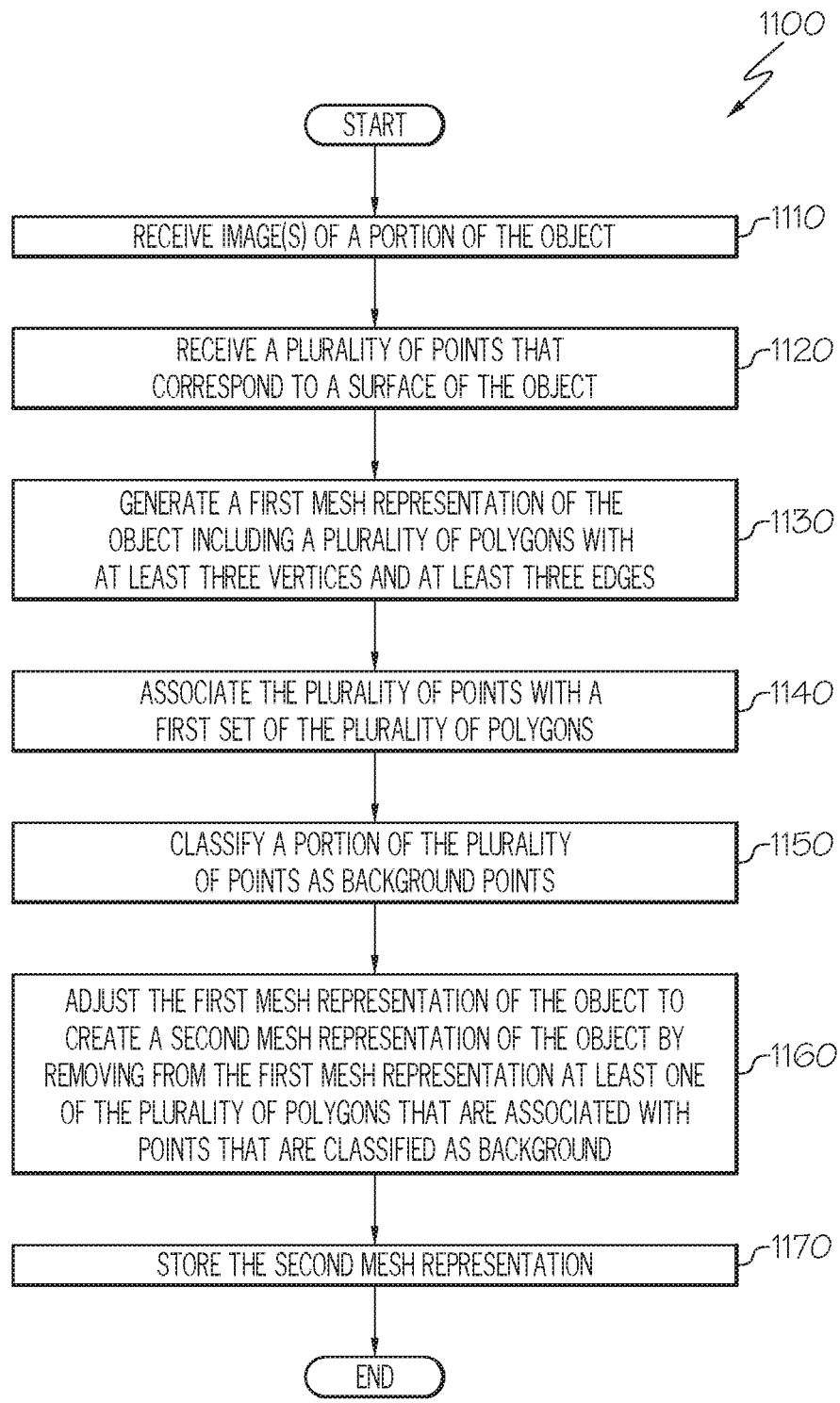

As described herein, the process of adjusting the mesh representation 400 may include incremental adjustment based on a series of received point clouds 200 from scanned images. FIG. 3B illustrates a method for processing an image to update a mesh representation 400 of an object 135, according to various embodiments described herein. As illustrated in FIG. 3B, adjusting the mesh representation 400 may be further improved by including the identification of background portions of the mesh representation 400 and removing these background portions early in the processing of the mesh representation 400.

Figure 4A:
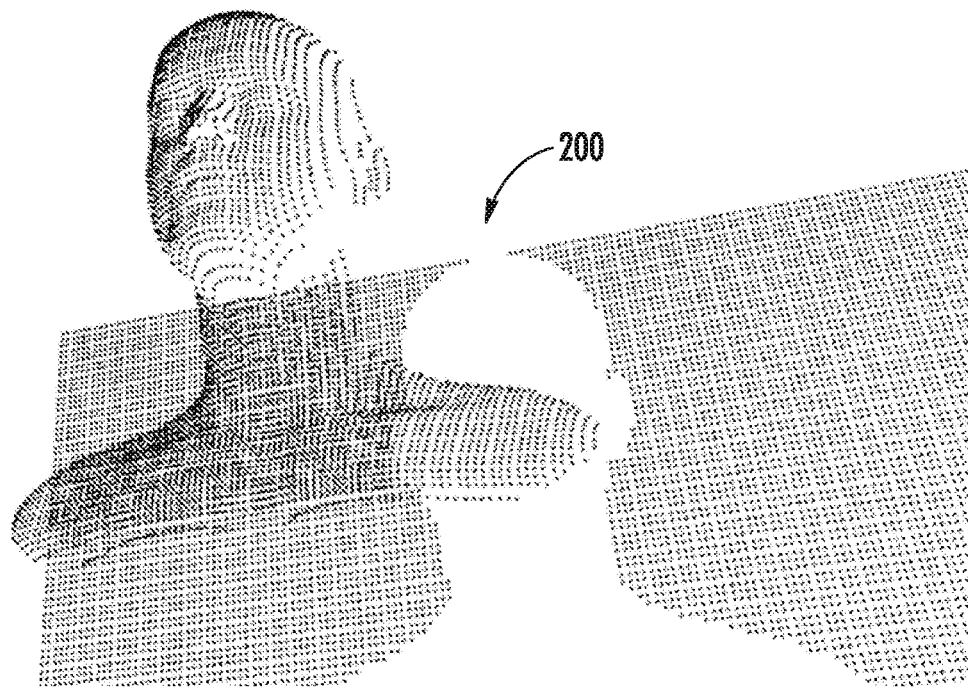
FIG. 4A illustrates a point cloud including a plurality of points representing an object, according to various embodiments described herein.

Referring to FIG. 3B, embodiments for processing the image to adjust the mesh representation 400 of an object 135 may include block 1110 to receive one or more image(s) of a portion of the object 135. These images may be received from an image sensor or camera or may be received as images stored in an appropriate data format. For example, as illustrated in FIG. 1, one or more images (e.g., 130a and/or 130b) of the object 135 may be captured by camera 100. At block 1120, a plurality of points 200 that correspond to the surface of the object 135 may be received based on the image(s). The plurality of points 200 may be received by an apparatus (e.g. a computing device) performing the method. In some embodiments, the plurality of points 200 may have been computationally determined from the one or more image(s) of the object 135 and subsequently received. In some embodiments, the plurality of points 200 may be determined by an electronic device performing the operations. In some embodiments, the plurality of points 200 may be received as a result of processing performed external to the electronic device performing the operations. Respective ones of the plurality of points 200 may be associated with data values, including location information, such as, for example, X. Y, and/or Z coordinates. For example, FIG. 4A illustrates a point cloud including a plurality of points representing an object, according to various embodiments described herein. As illustrated in FIG. 4A, an example scan of a face as an object 135 may generate a plurality of points 200 including both the face and a background (e.g. a wall) behind the face.

Figure 4B:
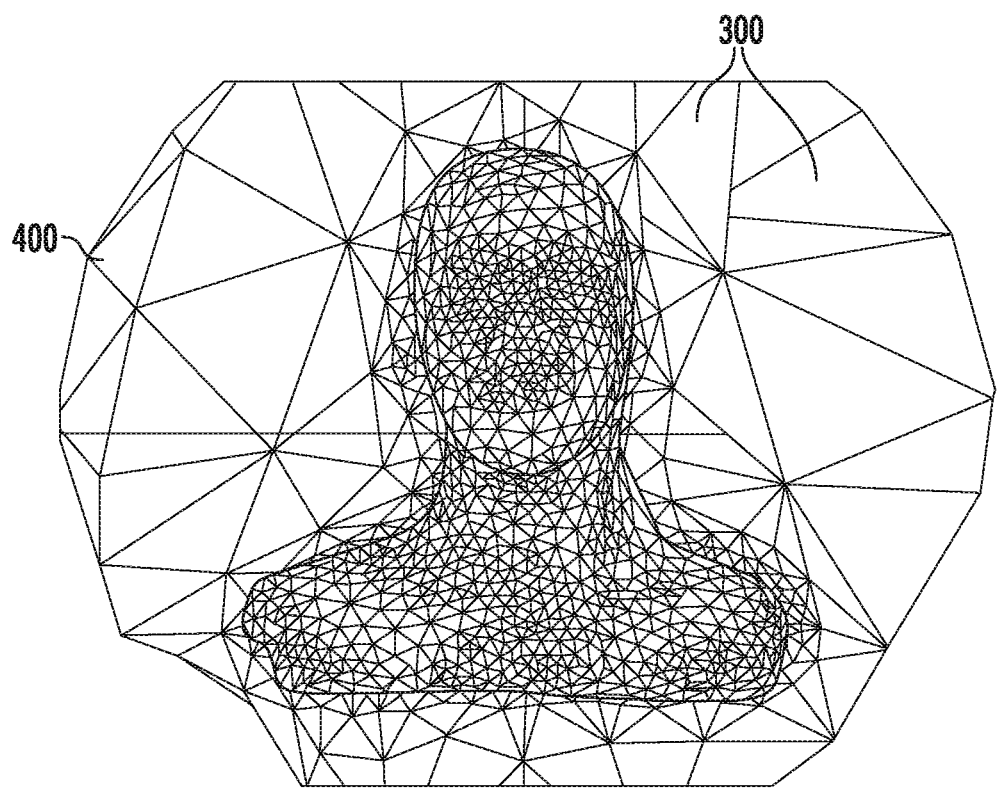
FIG. 4B illustrates a mesh representation based on the point cloud of FIG. 4A, according to various embodiments described herein.

At block 1130 a mesh representation 400 of the object 135 may be generated. FIG. 4B illustrates a mesh representation 400 based on the point cloud 200 of FIG. 4A, according to various embodiments described herein. The mesh representation 400 may include a plurality of polygons 300, respective ones of the polygons 300 having at least three edges 330 and at least three vertices 320. In some embodiments, the plurality of polygons 300 may include triangles having three edges 330 and three vertices 320. Generating the mesh representation 400 of the object 135 may include the generation of an initial mesh representation 400 (e.g., a collection of vertices, edges, and faces representing a "net" of interconnected polygons 300) that defines a general shape of the object 135 in three dimensions. The initial mesh representation 400 may be further sculpted to subdivide surfaces of the initial mesh representation 400 to derive adjusted locations and/or displacements for the vertex positions of sonic polygons 300, and storing the adjusted locations and/or displacements. The values of respective vertices of those polygons 300 may thus be adjusted from their initial value, such that the sculpted model may iteratively define portions with an adjusted topology (representing additional detail) relative to the initial or previous mesh representation 400.

At block 1140 processing of the mesh representation 400 may include associating points of the point cloud 200 with a first set of the polygons 300 of the mesh representation 400. In some embodiments, this associating may include mapping, based on the spatial coordinates of the points, the points of the point cloud 200 to the first set of the polygons 300 of the mesh representation 400. This block may assist in identifying which points of the point cloud 200 correspond to locations on the mesh representation 400. As shown in FIG. 4B, the, mesh representation 400 may include portions that are unhelpful (e.g. background portions) to the overall mesh representation 400 of the object 135. These background portions of the mesh representation 400 may require additional processing if they remain in the mesh representation 400, and may cause the process of refining the mesh representation 400 to take longer. These background portions of the mesh representation 400 may also reduce the overall quality of the final mesh representation 400, as processing to refine the mesh representation 400 may incorrectly use background portions of the mesh in its weighting to determine the final mesh representation 400.

Figure 5A:
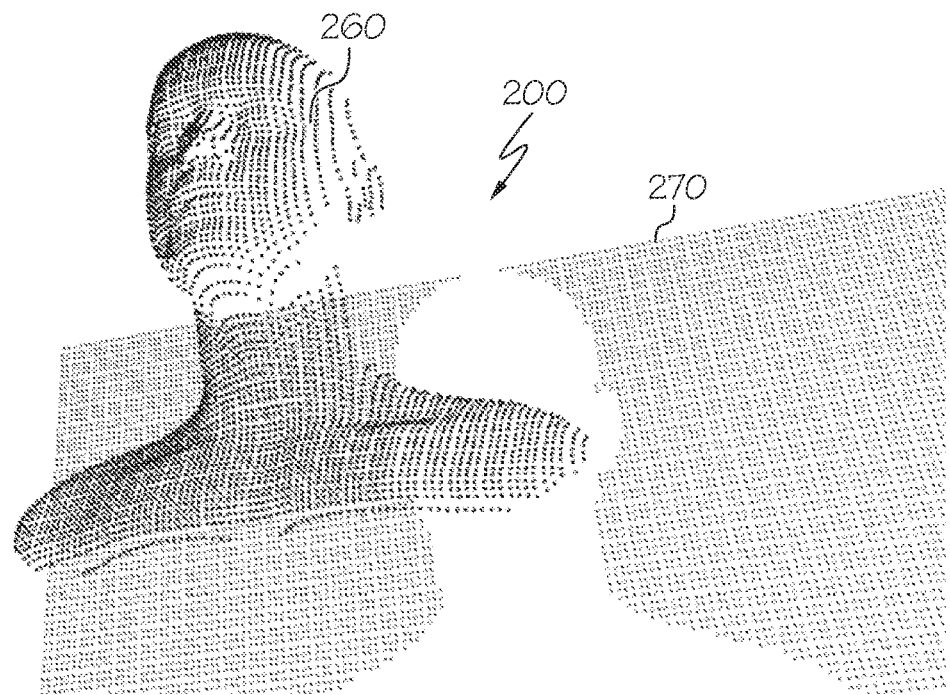
FIG. 5A illustrates the point cloud of FIG. 4A with a set of points identified as background points, according to various embodiments described herein.

In block 1150, the point cloud 200 is analyzed to classify a portion of the points of the point cloud 200 as background points 270. FIG. 5A illustrates the point cloud 200 of FIG. 4A with a set of points identified as background points 270, according to various embodiments described herein. As illustrated in FIG. 5A, respective points of the point cloud 200 may be individually analyzed to determine it the points meet a threshold for being a background point 270. Points of the point cloud 200 which meet the threshold may be classified as background points 270 and points which do not meet the threshold may be classified as foreground points 260.

The distance threshold for determining whether a point of the point cloud 200 is a background point 270 may be based on the location of the point with respect to the object 135 being scanned. The distance threshold may be calculated by determining coordinates of a virtual ellipsoid fitted around the center of the object 135. The distance threshold may be the distance to the center of the ellipsoid plus the product of the radius of the ellipsoid times a scale factor. Because the virtual ellipsoid is fitted around the object, the radius of the ellipsoid may be based on a size of the object 135. The scale factor may be based on a preference for aggressively identifying background elements. In some embodiments, the scale factor may be between about 1.1 and 1.5. In some embodiments, the scale factor may be 1.2.

Figure 5B:
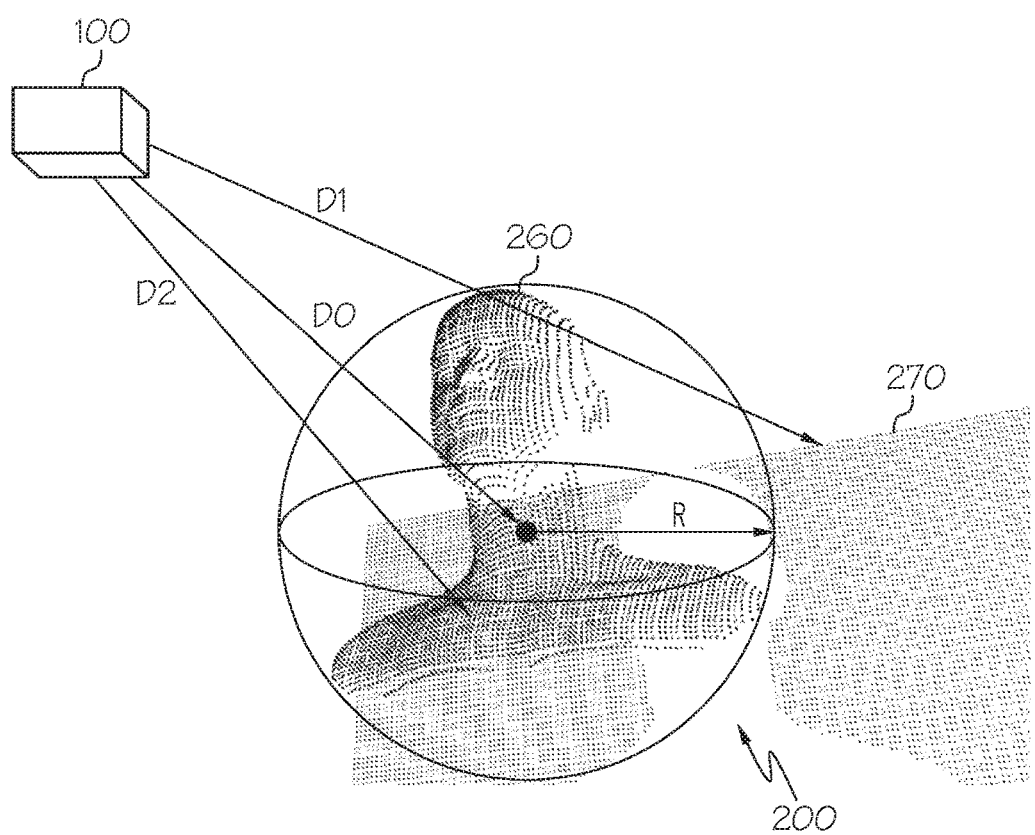
FIG. 5B illustrates the identification of a set of points from the point cloud of FIG. 4A as background points, according to various embodiments described herein.

FIG. 5B illustrates the identification of a set of points from the point cloud 200 of FIG. 4B as background points 270, according to various embodiments described herein. As illustrated in FIG. 5B, a distance D0 may be calculated from the camera 100 to the center of the object 135. A radius of a virtual ellipsoid R placed around the object may be calculated. A distance threshold may be calculated based on a determine distance D0 to the center of the object plus a product of the radius of the ellipsoid R times a scale factor. Based on this distance threshold, each of the points of the point cloud 200 may be analyzed. For example, based on X, Y, and/or Z coordinates of a point, a depth, or distance of the point from the camera 100, may be determined. A point of the point cloud 200 may be designated as a background point 270 if its distance (e.g., D1) from the camera is (e.g., its calculated depth) is greater than the distance threshold. A point of the point cloud 200 may be designated as a foreground point 260 if its distance (e.g., D2) from the camera is (e.g., its calculated depth) is less than the distance threshold.

Though an ellipsoid is discussed herein, it will be understood that other shapes and geometries, such as, for example, circles, squares, rectangles, and/or amorphous shapes may be used. In some embodiments, a hard distance threshold may be determined based solely on the determined center of the object 135.

In some embodiments, the distance threshold may be determined based on a distance from the center of the object 135 rather than a distance from the camera 100. That is to say that the distance threshold may be a designated distance from the center of the object 135, and the classification of a point of the point cloud 200 as a foreground point 260 or a background point 270 will be based on a determined distance of that point from the center of the object 135.

Figure 5C:
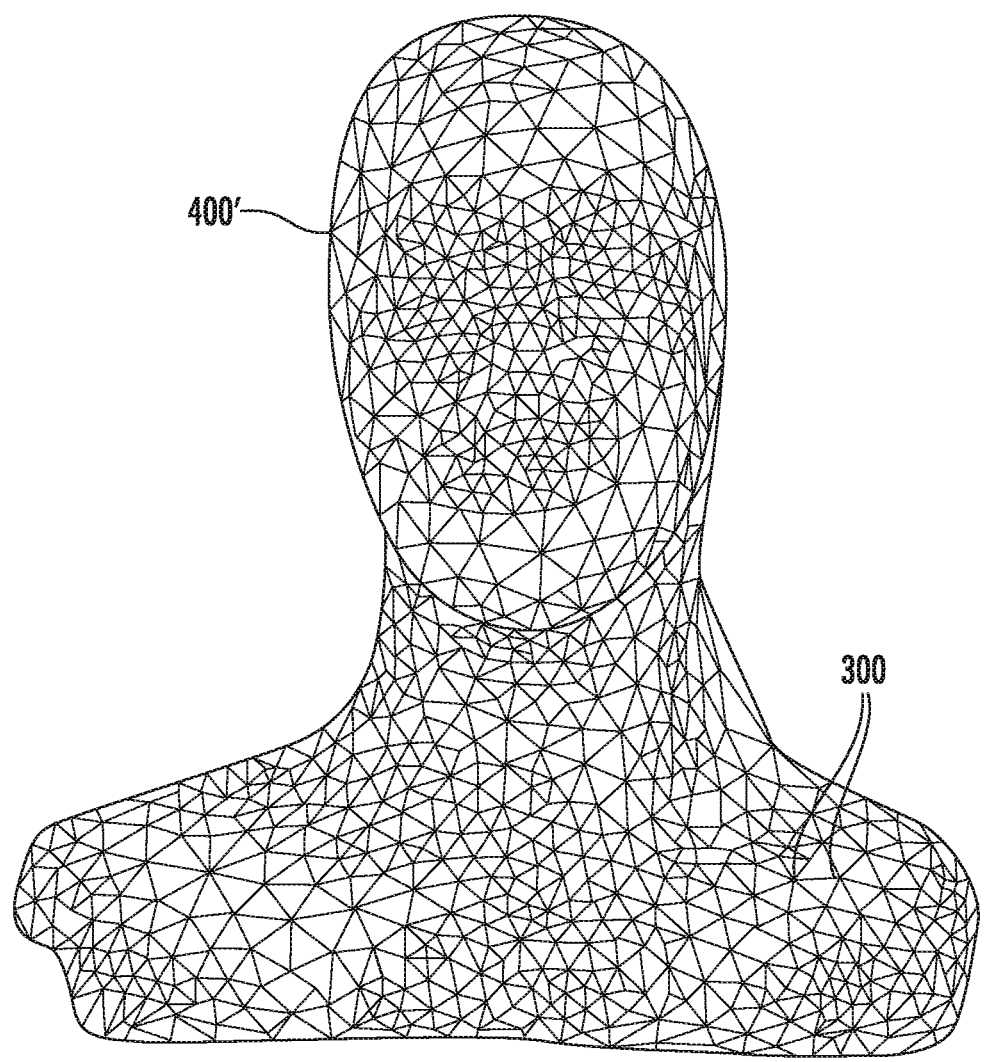
FIG. 5C illustrates an adjusted mesh representation of FIG. 4B after the removal of background polygons, according, to various embodiments described herein.

Once points of the point cloud 200 have been classified as background points 270 in block 1150, those background points 270 may be used in block 1160 to adjust a first mesh representation 400 of the object 135 to create a second mesh representation 400' of the object 135 by removing from the first mesh representation 400 certain ones of the polygons 300 that are associated with background points 270. As described previously herein, some of the polygons 300 of the mesh representation 400 may be mapped to and/or associated with particular ones of the point cloud 200. In block 1160, the mesh representation 400 may be adjusted by removing polygons 300 from the mesh representation 400 if it is determined that the polygon 300 is associated only with points that are classified as the background point 270. A polygon 300 that is associated only with background points 270 may be referred to herein as a background polygon 370. Though it is described herein that a background polygon 370 is associated with only background points 270, one of skill in the art will recognize that other implementations are possible. For example, a polygon 300 may be designated as a background polygon 370 if greater than 90% of the points with which the polygon 300 is associated are background points 270. FIG. 5C illustrates an adjusted mesh representation 400' of FIG. 4B after the removal of background polygons 370, according to various embodiments described herein. As illustrated in FIG. 5C, removal of the background polygons 370 may result in an adjusted mesh representation 400' that is smaller and easier to process.

Figure 6:
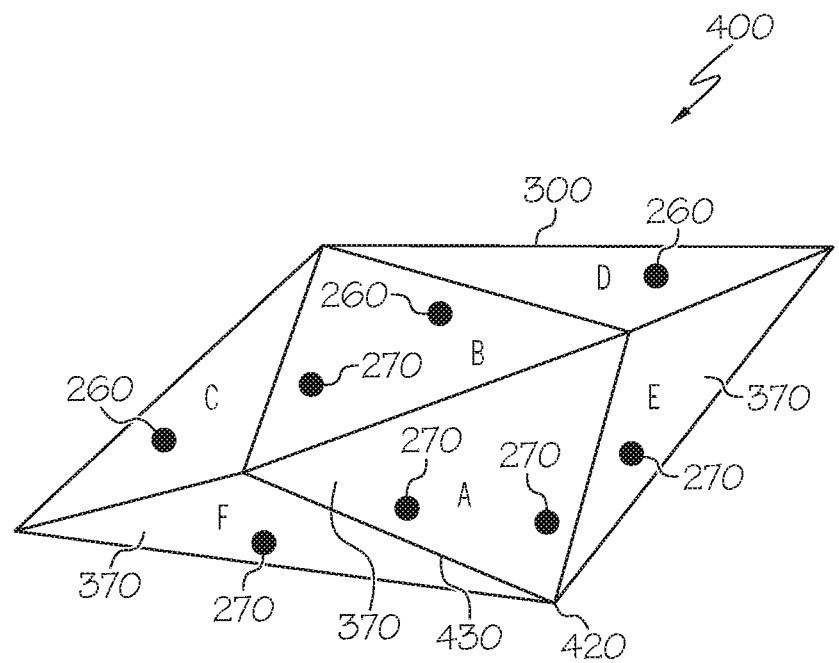
FIG. 6 illustrates a plurality of polygons from a mesh representation containing designated background vertices, according to various embodiments described herein.

The removal of the background polygons 370 to generate the adjusted mesh representation 400' may be performed based, in part, on the categorization of the points 200 associated with respective ones of the polygons 300. FIG. 6 illustrates a plurality of polygons 300 from a mesh representation 400 containing polygons 300 according to various embodiments described herein. As FIG. 6 only illustrates a portion of a mesh representation 400, it will be understood that this is only for example purposes, and the mesh representation 400 can extend beyond those polygons 300 illustrated in FIG. 6. As discussed previously herein, polygons 300 of the mesh representation 400 may be associated with particular points 200 of the point cloud 200, which may be further classified as foreground points 260 and background points 270. For example, as illustrated in FIG. 6, polygon A is associated with two background points 270. Polygon B is associated with one background point 270 and one foreground point 260. Polygons C and D are each associated with one foreground point 260. Polygons E and F may each be associated with one background point 270. Based on this example, Polygons A, E and F may be classified as background polygons 370, as each of them are associated with only background points 270. Polygon B may not be designated as a background polygon 370 since it is associated with at least one foreground polygon 260.

Figure 7:
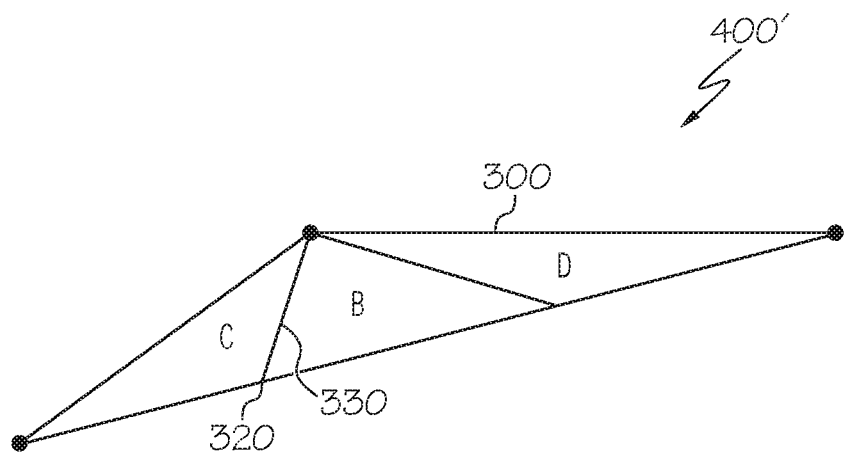
FIG. 7 illustrates the removal of a background triangle from the mesh representation of FIG. 6, according to various embodiments described herein.

Based or the classification of background polygons 370, polygons 300 of the mesh representation 400 may be designated for removal. For example, as illustrated in FIG. 6, polygons A, E, and F may be designated for removal. FIG. 7 illustrates the removal of a background triangle from the mesh representation of FIG. 6, according to various embodiments described herein. As illustrated in FIG. 7, the polygons A, E, and F have been removed, resulting in a reconfiguration to a new mesh representation 400'. Though FIG. 7 illustrates a simplified example of the removal with only a portion of the adjusted mesh representation 400', it will be understood that the removal of background polygons 370 (e.g., polygons A, E, and F) to create the adjusted mesh representation 400' may include the reconnection of the vertices 320 of the remaining polygons 300 (e.g., polygons B, C, D) to other polygons 300 of the adjusted mesh representation 400'.

As mentioned herein, a mesh representation 400, 400' may be watertight meaning that each polygon 300 of the mesh representation 400, 400' may be connected to another polygon 300 so as to create a contiguous, seamless surface. When creating the adjusted mesh representation 400' the watertight feature of the adjusted mesh representation 400' may be maintained. That is to say that the removal of the background polygons 370 may be done so that any remaining polygons 300 of the adjusted mesh representation 400' are reconnected to other polygons 300.

Though FIG. 7 illustrates the removal of background polygons 370 based only on the classification of points 200 associated with the polygon 300, other removal criteria are possible. For example, in some embodiments, there may be an additional classification of vertices 320 into background vertices 420 and an additional classification of edges 330 into background edges 430. A background vertex 420 may be a vertex 320 in which all of the polygons 300 surrounding the vertex 320 are background polygons 370. Referring to FIG. 6, one background vertex 420 is designated adjacent polygons A, E, and F. It will be understood that designating the background vertex 420 in FIG. 6 is based solely on the subset of a mesh representation 400 illustrated in that figure. In a larger mesh representation 400, the designation of a vertex 320 as a background vertex 420 would depend on all adjacent polygons 300.

A background edge 430 may be an edge 330 in which both of the polygons 300 on both sides of the edge 330 are background polygons 370. Referring to FIG. 6, at least one background edge 430 is designated between polygons A and F.

In some embodiments, the removal criteria may be based on additional criteria. Additional criteria may make the removal of background polygons 370 less aggressive. For example, in some embodiments, a polygon 300 may be designated for removal only if it is a background polygon 370 (i.e., it only has associated background points 270) and also if all of the vertices 320 of the background polygon 370 are background vertices 420. If these removal criteria were applied to the example of FIG. 6, there would be no background polygons (e.g., polygons A, E, and F) available for Ng/loyal since none of these polygons contain all background vertices 420.

Similarly, in some embodiments, a polygon 300 may be designated for removal only if it is a background polygon 370 (i.e., it only has associated background points 270) and also if all of the edges 330 of the background polygon 370 are background edges 430. If these removal criteria were applied to the example of FIG. 6, there would be no background polygons (e.g., polygons A, E, and F) available for removal since none of these polygons contain all background edges 430.

In some embodiments, a polygon 300 may be designated for removal only if it is a background polygon 370 (i.e., it only has associated background points 270) and also if all of the edges 330 of the background polygon 370 are background edges 430 and all of the vertices 320 of the background polygon 370 are background vertices 420. If these removal criteria were applied to the example of FIG. 6, there would be no background polygons (e.g., polygons A, E, and F) available for removal since none of these polygons contain all background vertices 420 and all background edges 430.

Referring again to FIG. 3B, once the adjusted mesh representation 400' has been created, the adjusted mesh representation 400' may be stored in block 1170.

As illustrated in FIG. 3A, generating the 3D representation of the object 135 may include additional iterations of receiving images(s) of the object 135 and processing the image(s) to update the mesh representation 400. Each iteration of the process may adjust the mesh representation 400 generated in a prior iteration so as to further refine the mesh representation 400. Stated another way, an iteration of the operations of the present inventive concepts may adjust a mesh representation 400 to create an adjusted mesh representation 400', and the adjusted mesh representation 400' may be used as the starting mesh representation 400 for the next iteration of the process.

During each iteration, the processing of the mesh representation (the blocks of FIG. 3B) may determine again the distance threshold used to classify the portion of the points 200 as background points 270 (block 1150). That is to say that each iteration may utilize a different distance threshold. The different distance thresholds may be based, for example, on adjusted calculations for the center of the object 135, adjusted calculations for a radius of an ellipsoid enclosing the object 135, and/or different scale factors. Similarly, different iterations of the operations may use different criteria, as described herein, for removal of background polygons 370. Thus, as the mesh representation 400 is iteratively retitled, operations to remove background polygons 370 from the mesh representation 400 may also be refined to more precisely target background portions of the mesh representation 400.

Referring again to FIG. 3A, after the scanning of the object 135 is determined to be complete (block 1200), the operations may continue at block 1300 in which the mesh representation 400 is finalized. This finalization may include additional refinement of the mesh representation 400 based on, for example, statistical analyses, additional weighting, and/or other processing factors.

Once the mesh representation 400 is finalized, the operations may include block 1400 for displaying the mesh representation 400. The mesh representation 400 may be displayed on a graphical display and/or output of the electronic device 700 (see FIG. 8). In some embodiments, the mesh representation 400 may be stored for display on another electronic device. For example, the mesh representation 400 may be used as part of a 3D, augmented-reality, and/or immersive environment. In some embodiments, the mesh representation 400 may be used to generate a 3D print file. The 3D print file may be used by a 3D printer to print a physical copy of the mesh, representation 400.

Figure 8:
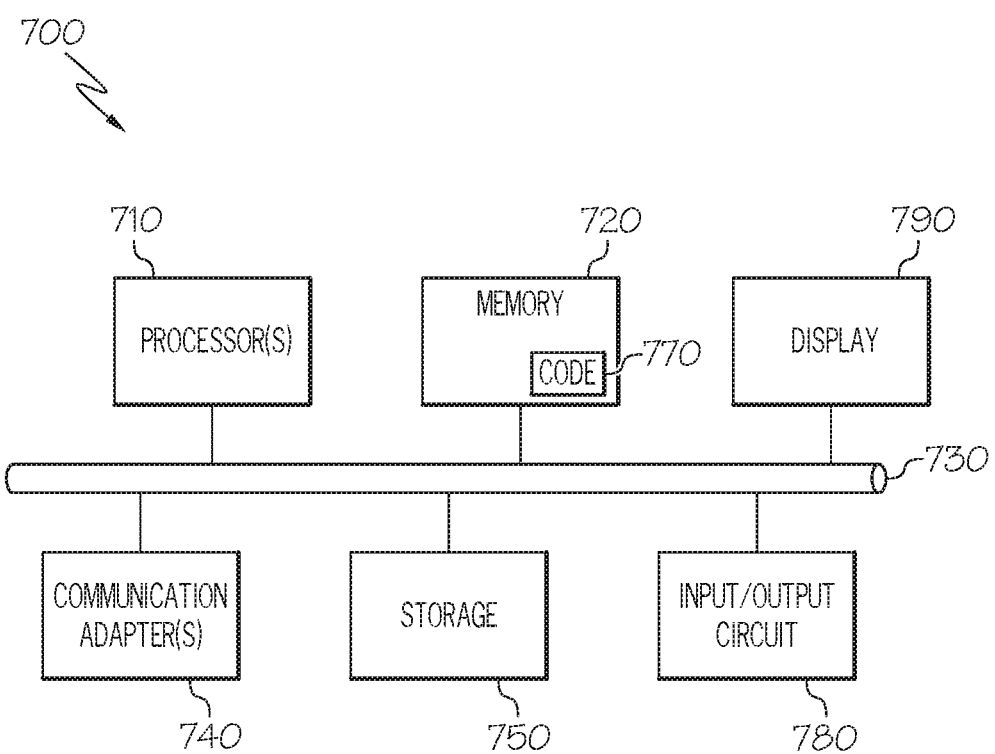
FIG. 8 is a block diagram of an electronic device capable of implementing the inventive concepts, according to various embodiments described herein.

FIG. 8 is a block diagram of an electronic device 700 capable of implementing the inventive concepts, according to various embodiments described herein. The electronic device 700 may use hardware, software implemented with hardware, firmware, tangible computer-readable storage media having instructions stored thereon and/or a combination thereof, and may be implemented in one or more computer systems or other processing systems. The electronic device 700 may also utilize a virtual instance of a computer. As such, the devices and methods described herein may be embodied in any combination of hardware and software. In some embodiments, the electronic device 700 may be part of an imaging system. In some embodiments, the electronic device 700 may be in communication with the camera 100 illustrated in FIG. 1.

As shown in FIG. 8, the electronic device 700 may include one or more processors 710 and memory 720 coupled to an interconnect 730. The interconnect 730 may be an abstraction that represents any one or more separate physical buses, point to point connections, or both connected by appropriate bridges, adapters, or controllers. The interconnect 730, therefore, may include, for example, a system bus, a Peripheral Component Interconnect (PCI.) bus or PCI-Express bus, a HyperTransport or industry standard architecture (ISA) bus, a small computer system interface (SCSI) bus, a universal serial bus (USB), HC (I2C) bus, or an Institute of Electrical and Electronics Engineers (IEEE) standard 1394 bus, also called "Firewire."

The processor(s) 710 may be, or may include, one or more programmable general purpose or special-purpose microprocessors, digital signal processors (DSPs), programmable controllers, application specific integrated circuits (ASICs), programmable logic devices (PLDs), field-programmable gate arrays (FPGAs), trusted platform modules (TPMs), or a combination of such or similar devices, which may be collocated or distributed across one or more data networks. The processor(s) 710 may be configured to execute computer program instructions from the memory 720 to perform some or all of the operations for one or more of the embodiments disclosed herein.

The electronic device 700 may also include one or more communication adapters 740 that may communicate with other communication devices and/or one or more networks, including any conventional, public and/or private, real and/or virtual, wired and/or wireless network, including the Internet. The communication adapters 740 may include a communication interface and may be used to transfer information in the form of signals between the electronic device 700 and another computer system or a network (e.g., the Internet). The communication adapters 740 may include a modem, a network interface (such, as an Ethernet card), a wireless interface, a radio interface, a communications port, a PCMCIA slot and card, or the like. These components may be conventional components, such as those used in many conventional computing devices, and their functionality, with respect to conventional operations, is generally known to those skilled in the art. In some embodiments, the communication adapters 740 may be used to transmit and/or receive data associated with the embodiments for creating the mesh generation described herein.

The electronic device 700 may further include memory 720 which may contain program code 770 configured to execute operations associated with the embodiments described herein. The memory 720 may include removable and/or fixed non-volatile memory devices (such as but not limited to a hard disk drive, flash memory, and/or like devices that may store computer program instructions and data on computer-readable media) volatile memory devices (such as but not limited to random access memory), as well as virtual storage (such as but not limited to a RAM disk). The memory 720 may also include systems and/or devices used for storage of the electronic device 700.

The electronic device 700 may also include one or more input device(s) such as, but not limited to, a mouse, keyboard, camera (e.g., camera 100 of FIG 1), and/or a microphone connected to an input/output circuit 780. The input device(s) may be accessible to the one or more processors 710 via the system interface 730 and may be operated by the program code 770 resident in the memory 720.

The electronic device 700 may also include a display 790 capable of generating a display image, graphical user interface, and/or visual alert. The display 790 may be accessible to the processor(s) 710 via the system interface 730. The display 790 may provide graphical user interfaces for receiving input, displaying intermediate operations/data, and/or exporting output of the methods described herein.

The electronic device 700 may also include a storage repository 750. The storage repository 750 may be accessible to the processor 710 via the system interface 730 and may additionally store information associated with the electronic device 700. For example, in some embodiments, the storage repository 750 may contain mesh representations, object data and/or point cloud data as described herein.

Though illustrated as separate elements, it will be understood that the storage repository 750 and the memory 720 may be collocated. That is to say that the memory 720 may be formed from part of the storage repository 750.

In the above-description of various embodiments, it is to be understood that the terminology used herein is for the purpose of describing particular embodiments only and is not intended to be limiting of the various embodiments as described herein. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

Like numbers refer to like elements throughout. Thus, the same or similar numbers may be described with reference to other drawings even if they are neither mentioned nor described in the corresponding drawing. Also, elements that are not denoted by reference numbers may be described with reference to other drawings.

When an element is referred to as being "connected," "coupled," "responsive," or variants thereof to another element, it can be directly connected, coupled, or responsive to the other element or intervening elements may be present. In contrast, when an element is referred to as being "directly connected," "directly coupled," "directly responsive," or variants thereof to another element, there are no intervening elements present. Like numbers refer to like elements throughout. Furthermore, "coupled," "connected," "responsive," or variants thereof as used herein may include wirelessly coupled, connected, or responsive. As used herein, the singular forms "a," "an," and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise," "comprising," "comprises" "include," "including," "includes," "have," "has," "having," or variants thereof are open-ended, and include one or more stated features, integers, elements, steps, components or functions but does not preclude the presence or addition of one in more other features, integers, elements, steps, components, functions or groups thereof.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) acid/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or flash memory) circuit, a portable compact disc read-only memory (CD-ROM), and a portable digital video disc read-only memory (DVD/BluceRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present disclosure may be embodied in hardware and/or in software (including firmware, resident software, microcode, etc.) that runs on a processor such as a digital signal processor, which may collectively be referred to as "circuitry," "a module," or variants thereof.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of tile flowcharts and/or block diagrams may be at least partially integrated. Finally, other blocks may be, added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings.

It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner arid process of making and using them, and shall support claims to any such combination or subcombination. Many variations and modifications can be made to the embodiments without substantially departing from the principles of the present invention. All such variations and modifications are intended to be included herein within the scope of the present invention.

The invention claimed is:

1. A method of creating a three-dimensional mesh representation of an object using at least one processor of an electronic device, the method comprising:
    receiving at the electronic device a plurality of points that correspond to a surface of the object, respective ones of the plurality of points having three-dimensional spatial coordinates;
    generating, by the at least one processor, a first mesh representation of a shape of the object, the first mesh representation comprising a plurality of polygons, respective ones of the plurality of polygons comprising at least three vertices and at least three edges;
    associating, by the at least one processor, the plurality of points with a first set of the plurality of polygons;
    classifying, by the at least one processor, a portion of the plurality of points as background points; and
    adjusting, by the at least one processor, the first mesh representation of the object to create a second mesh representation of the object by removing from the first mesh representation at least one of the first set of the plurality of polygons that is associated with the portion of the plurality of points-that are classified as the background points,
    wherein classifying the portion of the plurality of points as the background points comprises:
    determining a first distance to a center of the object from an image capturing device;
    calculating a distance threshold based on the first distance to the center of the object;
    determining a second distance to a first point of the plurality of points from the image capturing device; and
    classifying the first point of the plurality of points as one of the background points in response to determining that the second distance is greater than the distance threshold.

2. An imaging system for processing images, the imaging system comprising: a processor; and a memory coupled to the processor and storing computer readable program code that when executed by the processor causes the processor to perform operations comprising: receiving, within the memory of the imaging system, a plurality of points that correspond to a surface of an object, respective ones of the plurality of points having three-dimensional spatial coordinates; generating, within the memory, a first mesh representation of a shape of the object, the first mesh representation comprising a plurality of polygons, respective ones of the plurality of polygons comprising at least three vertices and at least three edges; associating the plurality of points with a first set of the plurality of polygons; classifying a portion of the plurality of points as background points; and adjusting the first mesh representation of the object to create a second mesh representation of the object by removing from the first mesh representation at least one of the first set of the plurality of polygons that is associated with the portion of the plurality of points that are classified as the background points, wherein classifying the portion of the plurality of points as the background points comprises: determining a first distance to a center of the object from an image capturing device; calculating a distance threshold based on the first distance to the center of the object; determining a second distance to a first point of the plurality of points from the image capturing device; and classifying the first point of the plurality of points as one of the background points in response to determining that the second distance is greater than the distance threshold.

3. The imaging system of claim 2, wherein calculating the distance threshold comprises: determining a distance radius based on a size of the object; and calculating the distance threshold as the first distance to the center of the object plus a product of the distance radius and a scale factor.

4. The imaging system of claim 2, wherein removing from the first mesh representation the at least one of the first set of the plurality of polygons comprises removing the at least one of the plurality of polygons responsive to determining that each point of the plurality of points that is associated with the at least one of the plurality of polygons is classified as one of the background points.

5. The imaging system of claim 2, wherein removing from the first mesh representation the at least one of the first set of the plurality of polygons comprises removing the at least one of the plurality of polygons responsive to determining that each point=of the plurality of points that is associated with the at least one of the plurality of polygons is classified as one of the background points and to determining that each of the at least three edges of the at least one of the plurality of polygons is adjacent a polygon of the plurality of polygons that is only associated with ones of the plurality of points that are classified as the background points.

6. The imaging system of claim 2, wherein removing from the first mesh representation the at least one of the plurality of polygons comprises removing the at least one of the first set of the plurality of polygons responsive to determining that each point of the plurality of points that is associated with the at least one of the plurality of polygons is classified as one of the background points and to determining that each of the at least three vertices of the at least one of the plurality of polygons is adjacent a polygon of the plurality of polygons that is only associated with ones of the plurality of points that are classified as the background points.

7. The imaging system of claim 2, wherein the plurality of polygons are triangles having three vertices and three edges.

8. The imaging system of claim 2, wherein the operations further comprise: receiving a second plurality of points that correspond to the surface of the object; associating the second plurality of points with a second set of the plurality of polygons of the second mesh representation; classifying a portion of the second plurality of points as the background points; adjusting the second mesh representation of the object to create a third mesh representation of the object by removing from the second mesh representation at least one of the second set of the plurality of polygons that is associated with the portion of the second plurality of points that are classified as the background points; and storing the third mesh representation in the memory.

9. The imaging system of any of claim 2, wherein the operations further comprise: displaying the second mesh representation on a display of the imaging system.

10. A computer program product for operating an imaging system, the computer program product comprising a non-transitory computer readable storage medium having computer readable program code embodied in the medium that when executed by a processor causes the processor to perform operations comprising: receiving a plurality of points that correspond to a surface of an object, respective ones of the plurality of points having three-dimensional spatial coordinates; generating a first mesh representation of a shape of the object, the first mesh representation comprising a plurality of polygons, respective ones of the plurality of polygons comprising at least three vertices and at least three edges; associating the plurality of points with a first set of the plurality of polygons; classifying a portion of the plurality of points as background points; and adjusting the first mesh representation of the object to create a second mesh representation of the object by removing from the first mesh representation at least one of the first set of the plurality of polygons that is associated with the portion of the plurality of points that are classified as the background points, wherein classifying the portion of the plurality of points as the background points comprises: determining a first distance to a center of the object from an image capturing device; calculating a distance threshold based on the first distance to the center of the object; determining a second distance to a first point of the plurality of points from the image capturing device; and classifying the first point of the plurality of points as one of the background points in response to determining that the second distance is greater than the distance threshold.

11. The computer program product of claim 10, wherein calculating the distance threshold comprises: determining a distance radius based on a size of the object; and calculating the distance threshold as the first distance to the center of the object plus a product of the distance radius and a scale factor.

12. The computer program product of claim 11, wherein the scale factor is between 1.1 and 1.5.

13. The computer program product of claim 10, wherein removing from the first mesh representation the at least one of the first set of the plurality of polygons comprises removing the at least one of the plurality of polygons responsive to determining that each point of the plurality of points that is associated with the at least one of the plurality of polygons is classified as one of the background points.

14. The computer program product of claim 10, wherein removing from the first mesh representation the at least one of the first set of the plurality of polygons comprises removing the at least one of the plurality of polygons responsive to determining that each point of the plurality of points that is associated with the at least one of the plurality of polygons is classified as one of the background points and to determining that each of the at least three edges of the at least one of the plurality of polygons is adjacent a polygon of the plurality of polygons that is only associated with ones of the plurality of points that are classified as the background points.

15. The computer program product of claim 10, wherein removing from the first mesh representation the at least one of the plurality of polygons comprises removing the at least one of the first set of the plurality of polygons responsive to determining that each point of the plurality of points that is associated with the at least one of the plurality of polygons is classified as one of the background points and to determining that each of the at least three vertices of the at least one of the plurality of polygons is adjacent a polygon of the plurality of polygons that is only associated with ones of the plurality of points that are classified as the background points.

16. The computer program product of claim 10, wherein the plurality of polygons are triangles having three vertices and three edges.

17. The computer program product of claim 10, wherein the operations further comprise: receiving a second plurality of points that correspond to the surface of the object; associating the second plurality of points with a second set of the plurality of polygons of the second mesh representation; classifying a portion of the second plurality of points as the background points; adjusting the second mesh representation of the object to create a third mesh representation of the object by removing from the second mesh representation at least one of the second set of the plurality of polygons that is associated with the portion of the second plurality of points that are classified as the background points; and storing the third mesh representation in a memory of an electronic device.

18. The computer program product of claim 10, wherein the operations further comprise:
displaying the second mesh representation on a display of an electronic device.

* * * * *

UNITED STATES PATENT AND TRADEMARK OFFICE
CERTIFICATE OF CORRECTION

PATENT NO. : 11,087,536 B2
APPLICATION NO. : 16/641451
DATED : August 10, 2021
INVENTOR(S) : Szasz et al.

Page 1 of 1

It is certified that error appears in the above-identified patent and that said Letters Patent is hereby corrected as shown below:

In the Claims

Column 17, Line 36, Claim 1: Please correct "points-that" to read -- points that --

Column 18, Line 29, Claim 5: Please correct "point=of" to read -- point of --

Signed and Sealed this
Fourteenth Day of December, 2021

Drew Hirshfeld
*Performing the Functions and Duties of the*
*Under Secretary of Commerce for Intellectual Property and*
*Director of the United States Patent and Trademark Office*